United States Patent [19]

More

[11] Patent Number: 4,617,960

[45] Date of Patent: Oct. 21, 1986

[54] VERIFICATION OF A SURFACE CONTROLLED SUBSURFACE ACTUATING DEVICE

[75] Inventor: Henry S. More, Los Altos, Calif.

[73] Assignee: Develco, Inc., Sunnyvale, Calif.

[21] Appl. No.: 730,705

[22] Filed: May 3, 1985

[51] Int. Cl.[4] .......... F16K 37/00

[52] U.S. Cl. .......... 137/554; 166/250; 340/855; 340/856; 324/323; 137/236.1

[58] Field of Search .......... 137/554, 236 S; 367/77; 340/855, 856; 324/323, 324, 325; 166/250, 254; 73/152

[56] References Cited

U.S. PATENT DOCUMENTS

| | | | |
|---|---|---|---|
| 3,209,323 | 9/1965 | Grossman, Jr. | 340/856 |
| 3,665,955 | 5/1972 | Connor, Sr. | 137/495 |
| 3,865,142 | 2/1975 | Begun et al. | 137/554 |
| 3,967,201 | 6/1976 | Roden | 325/28 |
| 3,975,674 | 8/1976 | McEven | 324/323 |
| 3,977,245 | 8/1976 | Clark et al. | 340/856 |
| 4,216,536 | 8/1980 | More | 367/83 |
| 4,337,829 | 7/1982 | Banzoli et al. | 137/236 S |
| 4,468,665 | 8/1984 | Thawley et al. | 340/856 |

*Primary Examiner*—Alan Cohan

*Assistant Examiner*—John A. Rivell

*Attorney, Agent, or Firm*—C. Michael Zimmerman

[57] ABSTRACT

A system for verifying the effectiveness of electromagnetic signal control of a subsurface safety valve installed in a well. Signals are transmitted from a surface station to actuate the subsurface installed valve. Signals received at the valve are decoded and information relating to them is stored. A sensor detects actual valve actuation and provides signals indicative thereof which are also stored. After the valve is removed from its downhole installation, the stored signals are read, and the data indicated thereby is compared with data recorded at the time of signal transmission from the surface.

9 Claims, 4 Drawing Figures

VERIFICATION OF A SURFACE CONTROLLED SUBSURFACE ACTUATING DEVICE

BACKGROUND OF THE INVENTION

This invention relates in general to the art of extracting a liquid fossil fuel (oil, gas or liquified coal) from beneath the earth's surface and other such underground activities. Subsurface actuators are used in the drilling, testing, completing, and producing phases of oil field activity. The primary application of this invention is to subsurface safety valves for installation in wells that are already producing oil or gas. However, the principles of the invention have other applications as well.

More specifically, the present invention is directed to an arrangement for verifying correct operation or determining intermittent or marginal performance, of a subsurface device, such as a valve, that is controlled by an electromagnetic signal transmitted by a control station located at the earth's surface, such as at a ground station or on a well platform in a sea. Although the invention as described pertains primarily to the verification of valve operation, it applies to any subsurface device actuated or controlled by a signal transmitted from the earth's surface.

Self-contained valve control systems for downhole installation are known. One example can be found in U.S. Pat. No. 3,665,955—Conner, Sr. (May 30, 1972). The subject matter of this U.S. patent is hereby incorporated by reference as if fully set forth herein. The valve can be responsive to pressure, flow rate, sound, or electromagnetic signals at the valve location. Also, wireless signalling to/from a subterranean device is known. An example can be found in U.S. Pat. No. 3,967,201—Rorden (June 29, 1976). The subject matter of this U.S. patent is hereby incorporated by reference as if fully set forth herein.

A significant problem with valves or other actuating devices installed downhole is that it is not possible to know for certain whether a particular installation is working properly. The low frequency communication channel between the earth's surface and the subsurface valve is a noisy one (low S/N ratio). Not all control information transmitted at the surface is properly received and acted upon. Over the course of the life of a particular subsurface installation, the subsurface installed device may be called upon many times to respond to various control signals transmitted at the earth's surface for opening and closing a valve. Later, when the valve or other device is removed from its subsurface installation, it is not known whether the device responded properly to the various signals transmitted to it. In other words, there is no presently known system for verifying that a transmission of control information from the surface to a downhole installation was effective.

Verification of data transmitted from a subsurface installation to the earth's surface was addressed in U.S. Pat. No. 4,216,536—More (August 5, 1980). The disclosure of that patent is incorporated herein by reference as if fully set forth herein. In the More '536 patent, there is described a system for storing downhole data (measurements of various physical parameters at the downhole location) sensed by a subsurface device and transmitting that data to the surface whereat it is received and stored. Later, after retrieving the subsurface device from its downhole installation, the data stored downhole is read from storage and compared with the data received and stored at the surface. Thus, the effectiveness of the transmission of data from the downhole installation to the earth's surface can be determined.

The problem remains as to how to verify correct operation or determine intermittent or marginal performance of a downhole actuating device, such as a valve, in response to control signals transmitted from the earth's surface to the downhole device over a noisy communication channel.

SUMMARY OF THE INVENTION

This invention provides an arrangement including apparatus and method for providing effective verification of the operation of surface controlled actuating devices such as valves installed subsurface. Use of this invention insures that nonfunctional or marginally operating downhole actuators are reliably detected so that corrective steps can be taken, if necessary. The invention is particularly applicable to multiple well head oil or gas field installations wherein valves are installed in each of the wells. Control of all valves is from a surface control(led) system which transmits signals addressing any particular valve to be actuated. The surface control system includes a surface control station installed at a convenient surface location. It can be operated locally via a key pad input or remotely via a remote control system. The surface control system includes a transmitter at the earth's surface for transmitting signals to a receiver associated with the subsurface installed actuable device.

The subsurface actuating device, in the preferred embodiment, is a subsurface actuating valve (SAV). The SAV is most effectively installed in a tubing nipple below the packer of a well. The valve mechanism controls the flow of oil or gas from the casing of the well below the packer into the tubing. Electromagnetic signals transmitted by the transmitter of the surface control system are sensed by an antenna and processed by a receiver which includes means for amplifying and filtering signals from the antenna. Ultimately, these signals are converted into a digital data format and processed by a microprocessor operating under program control to decode a received message. The microprocessor determines whether a particular received signal is intended for its associated valve (as opposed to some other valve), and if so, what valve response is being commanded. A real time clock provides a time reference that can be tagged to the recording of received commands.

If the microprocessor determines a received signal to be a valve command for its associated SAV, it actuates a valve control which in turn actuates the valve to assume the commanded state. A sensor is provided at the downhole location for mechanically sensing valve motion and providing a signal indicative of the valve state. This signal is input to the microprocessor for ultimate storage in a bulk memory along with time information from the real time clock and information about the received signal, such as measured signal to noise (S/N) ratio. Later, when the SAV is removed from its downhole installation, the control information stored in the bulk memory is read via a communications interface by the surface control system. The surface control system then correlates data, previously stored at the surface relating to its transmissions to the various valves, with control information read from the bulk memory of each valve or valves and determines the effectiveness of remote actuation of such valve or valves.

BRIEF DESCRIPTION OF THE DRAWINGS

The presently preferred embodiment of the invention will be described in greater detail with reference to the accompanying drawings, wherein.

DETAILED DESCRIPTION OF THE PREFERRED EMBODIMENT

Figure 1:
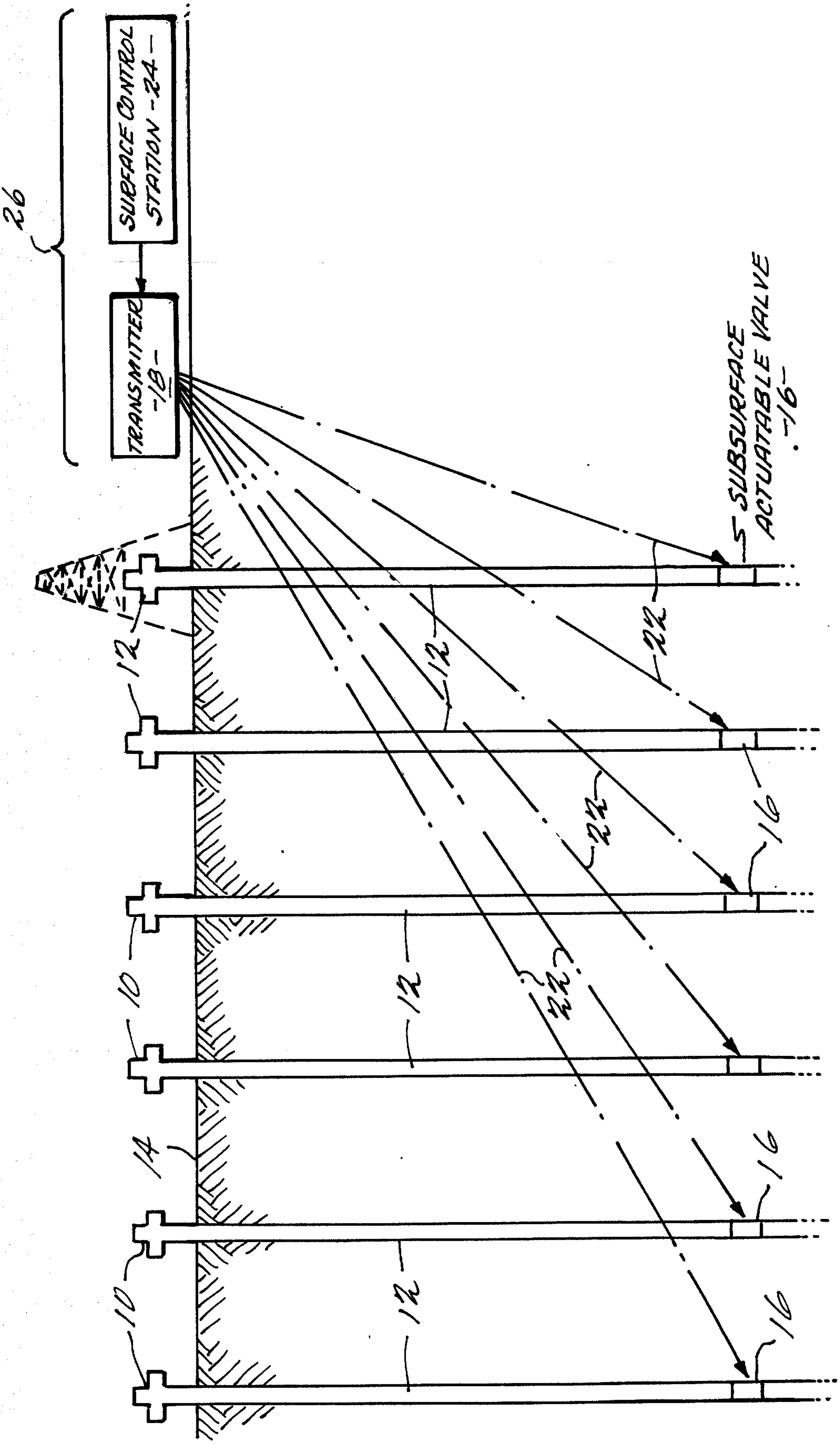
FIG. 1 is a schematic drawing of a multiple well head oil field illustrating, in general terms, the application of the present invention.

Referring now to FIG. 1, there is schematically shown an oil or gas production field having a plurality of well heads 10. Associated with each well head 10 is a well bore 12 beneath the surface of the earth represented by ground level 14. (The invention is equally applicable to a sea installation in which the earth's surface is represented by a sea level.) A subsurface actuating valve (SAV), referred to generally by reference numeral 16, is installed downhole in each of well bores 12. The SAVs 16 are controlled by signals transmitted by a transmitter 18. The electromagnetic signals transmitted by transmitter 18 are symbolized by lines 22.

Figure 2:
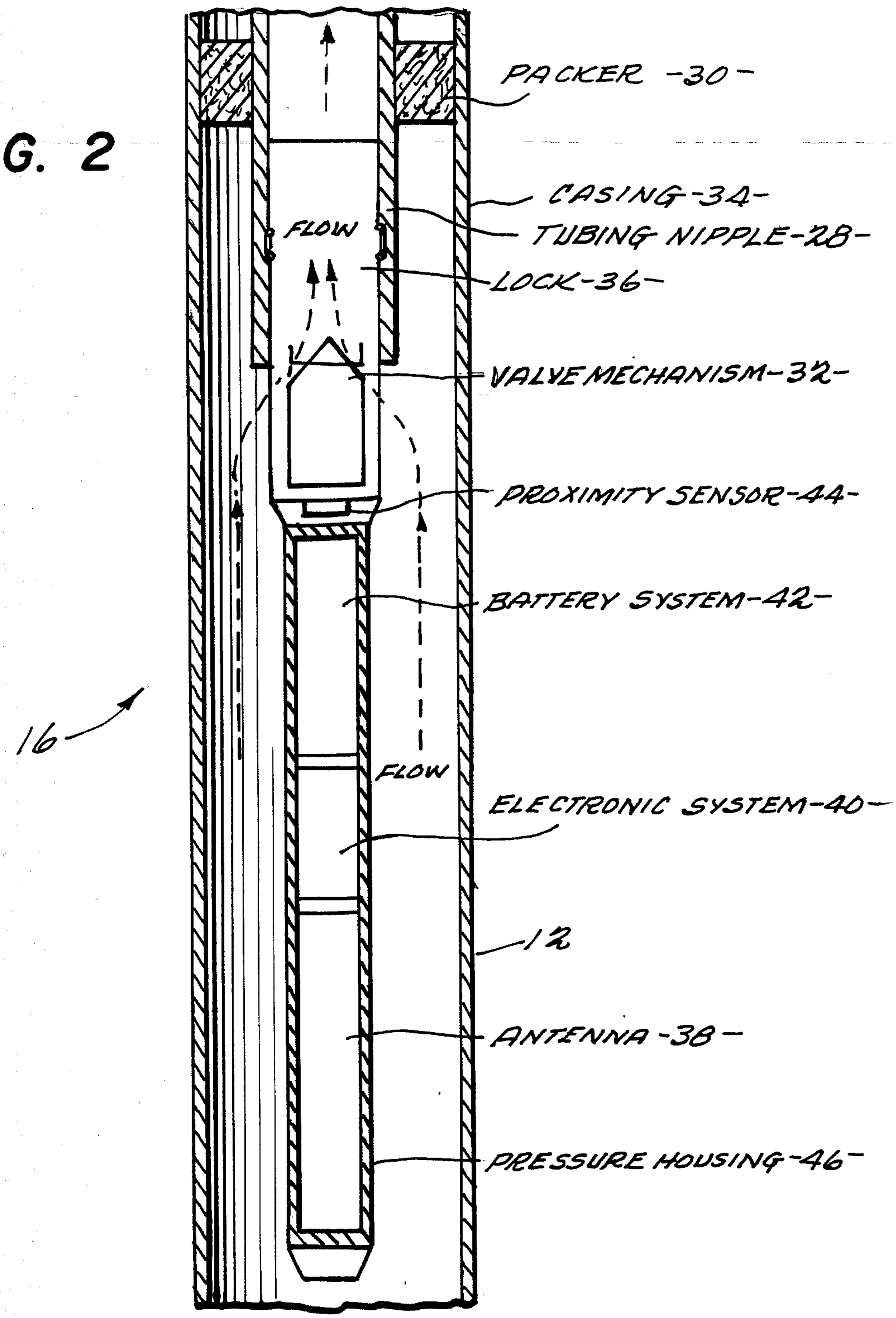
FIG. 2 is a schematic diagram of the general arrangement of a subsurface actuating valve.

Referring now to FIG. 2, there is shown a schematic diagram of the general arrangement of a SAV 16. This diagram is not intended to show all of the mechanical details of a SAV, but only its general layout since SAVs are well known and the structural details of the SAV are not important to this invention. SAV 16 is shown installed downhole in a well bore 12. Preferably, the installation of SAV 16 within well bore 12 is such that it is wire line retrievable. It is installed in a tubing nipple 28 below a packer 30. A valve mechanism 32 controls the flow of produced fluids from inside a casing 34 of the well to the inside of the tubing nipple 28. A lock 36 is positioned above valve mechanism 32 to hold the assembly in the tubing nipple. Signals transmitted by transmitter 18 at the earth's surface are picked up by an antenna 38. The signals are decoded by an electronic system 40 which determines whether a received signal is intended to command this particular valve as opposed to some other valve, and if so, what valve control is being commanded. Power for SAV 16 is provided by a battery system 42 which could include a single or multiple batteries. It can even include a secondary battery charged by a device for extracting energy from the flow of fluids produced by the well.

If a received signal commands actuation of this SAV 16, electronic system 40 will actuate valve mechanism 32. A proximity sensor 44 is positioned so as to sense movement of a moving part of valve mechanism 32. Sensor 44 provides a signal to electronic system 40 indicative of the state of valve mechanism 32. While in this preferred embodiment a physical sensor of valve position is provided, it will be recognized that the state of the valve can be sensed indirectly by sensing, for example, fluid flow through the valve. This state information is recorded by electronic system 40 and saved for later use when SAV 16 is extracted from its downhole installation. The various parts of SAV 16 are housed within a pressure housing 46 for their protection.

Figure 3:
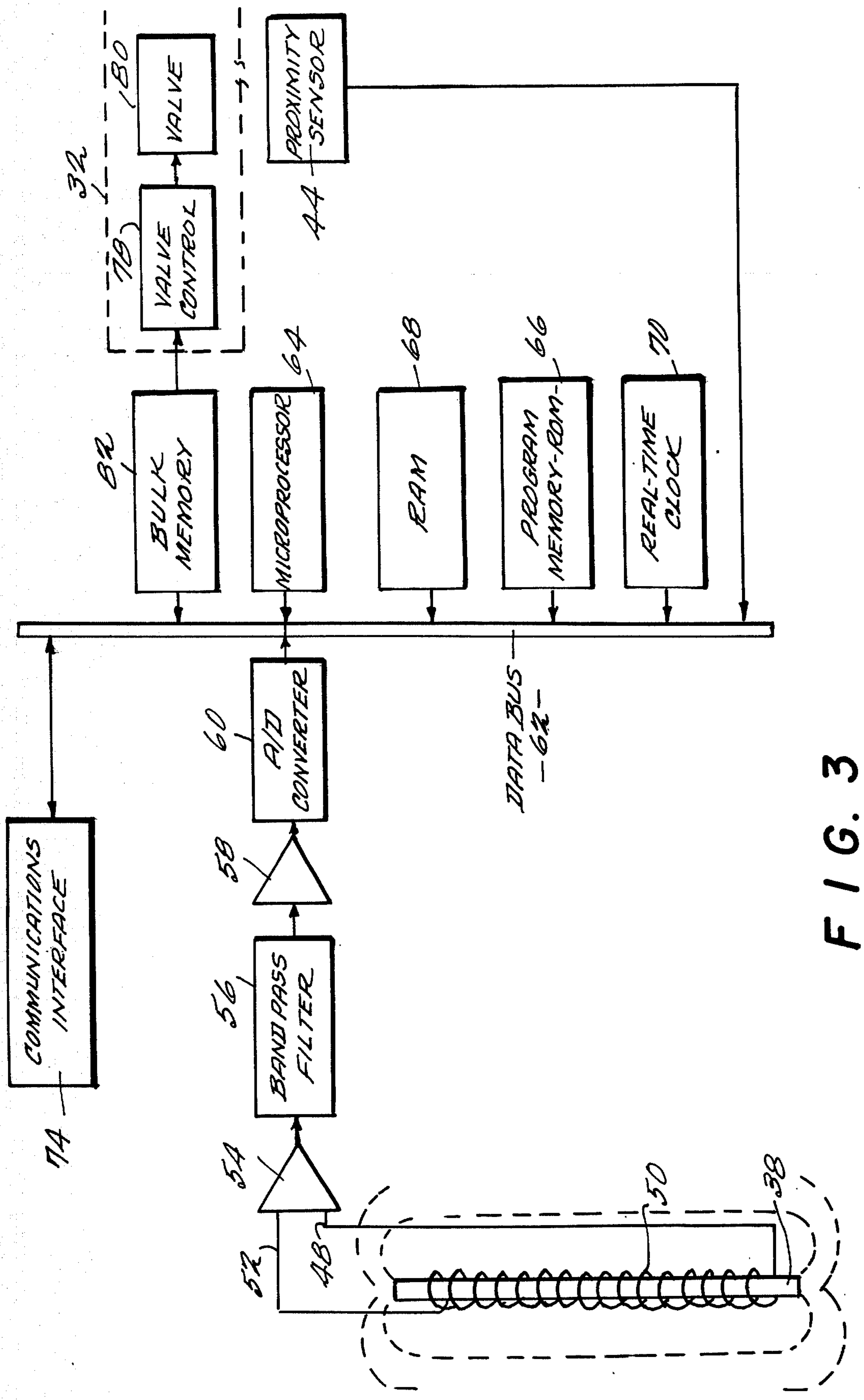
FIG. 3 is a block diagram of a electronics portion of the subsurface actuating valve shown in FIG. 2.

Referring now to FIG. 3, there is shown a block diagram of various electronic portions of SAV 16. Aside from antenna 38, valve mechanism 32, and proximity sensor 44, the other blocks shown in FIG. 3 are part of electronic system 40 shown in FIG. 2. Antenna 38 includes a magnetic core 48 wrapped with a winding 50.

Electromagnetic signals from transmitter 18 (shown in FIGS. 1 and 4) are received by antenna 38. The electromagnetic signal induces an electrical signal on leads 52 which are amplified by a differential amplifier 54 acting as a preamplifier. An output signal from amplifier 54 is filtered by a bandpass filter 56 and further amplified by an amplifier 58. The analog signal output from amplifier 58 is converted into a digital data format by an A/D converter 60. The resulting data from A/D converter 60 is coupled to a data bus 62. Bandpass filter 56 restricts signals flowing through it to a frequency range of signals transmitted by transmitter 18.

Figure 4:
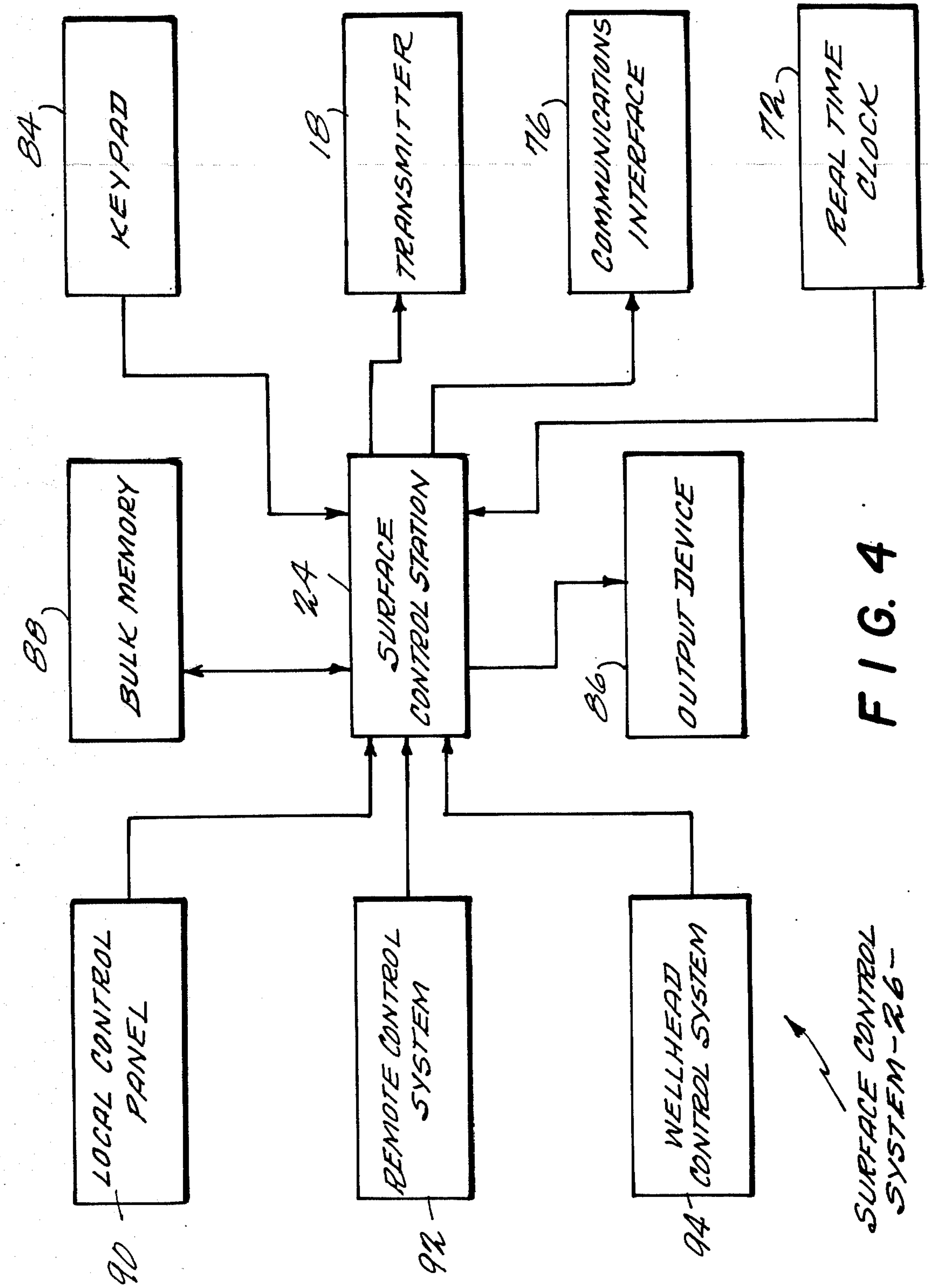
FIG. 4 is a block diagram of the surface control system including the surface control station and transmitter shown in FIG. 1.

The decision making function of electronic system 40 is carried out by a microprocessor 64 coupled to data bus 62. It is presently preferred that microprocessor 64 be a low power device such as, for example, an RCA 1802 or 1805, an NSC 800 (National Semiconductor), or Motorola 146805 or MC 68HC11. Each of the aforementioned microprocessor chips is a CMOS device which operates on a 8-bit bus structure. Microprocessor 64 operates according to a program code stored in program memory of a read only memory (ROM) 66, also coupled to data bus 62. Scratch pad memory is provided by a random access memory (RAM) 68, and a real time clock 70, coupled to data bus 62, provides a real time signal. The clock is synchronized at initialization of SAV 16 before downhole installation to a corresponding real time clock 72 (shown in FIG. 4) in surface control system 26. Input to SAV 16, at the time of initialization, is by means of a communications interface 74 coupled to data bus 62 (FIG. 3) and a corresponding communications interface 76 of surface control system 26 (FIG. 4). At the time of initialization, communication interfaces 74 and 76 are electrically coupled either directly or indirectly via some other communication channel such as a radio channel, optical interface, etc.

When microprocessor 64 determines that a valve actuation is necessary, it sends a signal to a valve control 78 of valve mechanism 32 which in turn actuates a valve 80 of valve mechanism 32. Valve actuation is sensed by proximity sensor 44 which provides a signal to data bus 62. A bulk memory 82 is provided for storing data as to attempted and actual valve actuations along with other data related to a valve actuation command, such as time according to real time clock 72, signal to noise (S/N) ratio of a received signal, etc.

The following explains how signals transmitted from the surface are utilized by SAV 16. Program code instructions stored in program memory of ROM 66 cause the microprocessor to sample the output of A/D converter 60 at specified intervals of time, to perform digital filtering on the sampled outputs and then to synchronize itself with signals received from the surface. Once synchronized, microprocessor 64 can determine whether or not it is receiving commands directed to its specific channel number to open or close its associated valve. If it should determine that the valve is to be opened, microprocessor 64 sends the appropriate signal to valve control 78. If microprocessor 64 should determine that the valve is to be closed, it sends the appropriate signal to valve control 78. If no signals are received at all or if transmission from the surface ceased, the valve would be commanded by microprocessor 64 to close or remain closed.

Whenever any of these commands or events are recognized, microprocessor 64 also reads real time clock 70. Furthermore, it calculates a measure of the signal-to-noise (S/N) ratio of the signal being received from the surface. Time and S/N ratio data are then stored in bulk memory 82, downhole. This stored data indicates activity such as opening or closing of a valve, battery status, S/N ratio below a predetermined threshold, etc. Such activity data preferably would be identified by a four bit digital code. Also stored would be the date and time of day which preferably would constitute 24 bits of digital data. Signal strength data would preferably comprise 8 bits of recorded digital data.

Stored data could also include information resulting from false recognitions as well as indications of low battery voltage and low S/N ratio of a received signal.

Referring now to FIG. 4, there is shown a block diagram of surface control system 26. The heart of surface control system 26 is surface control station 24 which is also shown in FIG. 1.

At such time as a SAV 16 becomes inoperative due, for example, to an exhausted battery or system malfunction, it would be retrieved by wire line and positioned at the surface such that its communication interface 74 could be connected with communications interface 76 of surface control system 26. Microprocessor 64 would be instructed to read out the contents of bulk memory 82 into surface control system 26. When this process is completed, the surface control system 26 can be instructed via a key pad 84 to display or print, as represented by the representation 86 of an output device, the contents of bulk memories 82 and 88. Bulk memory 88 would have stored in it information about transmissions sent to the various SAVs 16. The information from bulk memory 88 relating to the particular SAV 16 being read would be correlated with the information read from bulk memory 82 of the SAV. Review of these two sets of data allows an assessment to be made of the ability of the valve assembly to receive commands from the surface and provides an indication of the inherent signal-to-noise ratio and its probability of error over the period of time the valve was installed.

Surface control station 24 is preferably a computer implemented station which can receive inputs from key pad 84, a local control panel 90, and a remote control system 92 so that the surface control system 92 can be operated either locally or remotely. Surface control station 24 also accepts inputs from a well head control system 94 which includes emergency valve closure switches located in close proximity to their respective well heads.

The following explains further details of the system operation. Before a SAV 16 is to be delivered to a well head for installation, communication interface 74 is connected to communications interface 76 of surface control system 26. SAV 16 is initialized and instructed to respond to signals of a particular command channel representing the well into which it is to be installed. In addition, the time of day is transmitted to the SAV 16. Preferably, the following information is stored in SAV 16 at the time of initialization. Initialization-4 bits: year 4 bits, month 4 bits, day 5 bits, hour 5 bits, minutes 6 bits, for a total of 24 bits or 3 bytes of information. Also, a channel number such as, for example, 1 of 27 channels is stored in a 5 bit data word.

The same information is stored in bulk memory 88 of surface control system 26 along with the channel number to which it relates. In this way, all activities (initialization, valve assembly, memory readout when a valve assembly is pulled from the well, commands to open or close while in the well, etc.) are filed according to channel number for ease of later comparison.

After initialization, SAV 16 is prepared and run into the well by wire line, typically by using a lubricator on the well head into which the SAV 16 is being installed. When the valve assembly is locked in place in the well in the position in which it is to perform its function, the valve itself is in the closed position and valve control 78 is deenergized.

While the invention has been described in connection with what is presently considered to be the most practical and preferred embodiments, it is to be understood that the invention is not to be limited to the disclosed embodiments but on the contrary, comprehends various modifications and equivalent arrangements included within the spirit and scope of the claims, and the scope of the claims is to be accorded the broadest interpretation so as to encompass all such modifications and equivalent structures.

What is claimed is:

1. A subsurface actuator verification system, comprising:

an actuating device adapted for subsurface installation;

means for transmitting a signal from the earth's surface for controlling an operational state of said device when it is installed subsurface;

means, adapted to be installed proximate said device, for receiving said signal transmitted from the earth's surface and controlling an operational state of said subsurface-installed device in accordance therewith;

means for detecting an actual operational state of said device and generating state data indicative thereof;

means, in proximity to said device, for storing said state data; and means for reading out said data from said storing means upon removal of said device from its subsurface installation enabling a comparison of data from said storage means with information indicative of said signal previously transmitted from the earth's surface.

2. A system according to claim 1 further comprising:

means, at the earth's surface, for storing the information of said transmitted signal, substantially simultaneously with its transmission; and means for reading out the surface stored information and correlating it with the data read from said storing means to provide an indication of the effectiveness of communication from surface to subsurface installation.

3. A system according to claim 1 wherein said actuating device comprises a valve.

4. A system according to claim 2 wherein said actuating device comprises a valve.

5. A surface controlled valve system comprising:

at least one electromagnetic signal controllable valve arrangement, adapted for subsurface installation, for valving a fluid in accordance with signals transmitted from the earth's surface, said valve arrangement including means for receiving a signal, determining whether the signal is intended for the valve arrangement receiving it, identifying a valve state commanded by the received signals, changing the state of the valve if called for by the received signal and recording data indicative of received signals and any state changes of said valve; and a surface control station at the earth's surface including means for (a) transmitting signals to address said valves for controlling its state after the valve is installed subsurface, (b) recording data indicative of such transmissions, (c) reading data collected by a valve removed from its subsurface installation indicative of signals received thereby and valve state changes, and (d) displaying data read from the valve and data recorded by the surface control station at transmission times.

6. A system according to claim 5 including a plurality of signal controllable valve arrangements, each installed in a separate subsurface installation.

7. A method of verifying operation of a subsurface installed device, comprising the steps of:

installing the device at a subsurface location;

transmitting at the earth's surface a signal to the device for commanding it to assume a certain operational state;

recording, in a memory at the surface, indication of said command substantially simultaneously with its transmission;

receiving at the subsurface-installed device, the surface transmitted signal;

operating the device in accordance with the received signal;

sensing the operational state of the device;

recording, in a memory of the device, data related to the received signal and operational state of the device;

retrieving the device from its subsurface installation;

reading the data stored in device memory;

reading the information stored in surface memory; and comparing said data and information so that an assessment can be made as to the effectiveness of communication from surface to subsurface installation.

8. A method according to claim 7 wherein said sensing step comprises sensing a movement of an element of said device and generating a signal indicative thereof.

9. A method according to claim 7 wherein the device is a valve and the operation state is whether the valve is open or closed.

* * * * *